Patented June 5, 1951

2,555,344

UNITED STATES PATENT OFFICE 2,555,344

REDUCTION OF ESTRONE ESTERS TO ALPHA ESTRADIOL

Stephen Kaufmann and George Rosenkranz, Mexico City, Mexico, assignors to Syntex, S. A., Mexico City, Mexico, a corporation of Mexico No Drawing. Application December 23, 1948, Serial No. 67,095

3 Claims. (Cl. 260—397.5)

The present invention relates to a method for the production of hormones. More particularly, the present invention relates to a new method for the production of estradiol.

In U. S. Patent Application, Ser. No. 16,886 of Rosenkranz and Kaufmann, filed March 24, 1948, a method is disclosed for the production of estradiol by reacting lithium aluminum hydride (LiAlH$_4$) and estrone, both components being dissolved in a dry inert solvent, preferably an ether or mixtures thereof such as dry diethyl ether, dioxan or tetrahydrofuran, and thereafter hydrolyzing the metal alcoholate complex formed.

In accordance with the present invention, it has been found that instead of estrone, lower fatty acid esters of estrone may be advantageously used since these esters have a much higher solubility in the desirable ether solvents than estrone. It has also been found, in accordance with the present invention, that the ester group also reacts with the lithium aluminum hydride providing an excess of lithium aluminum hydride is used, and upon hydrolysis of the complex formed pure estradiol is obtained.

The present method is carried out by dissolving a suitable lower fatty acid ester of estrone, such as the acetate, propionate or butyrate of estrone, in a dry solvent of the character hereinbefore set forth and slowly adding the ester solution to a similar solution of an excess of lithium aluminum hydride. The components are then allowed to react under ordinary or slightly raised temperatures under gentle reflux for a short time. After the reaction, which is carried out under anhydrous conditions, is complete, the reaction mixture is cooled. Water is then added to destroy the excess lithium aluminum hydride and the complex is decomposed with dilute acid, generally mineral acid, such as 10% sulphuric acid, but other acids may be used.

Example I

A solution of one gram of estrone acetate, melting point 125°–126° C., in 50 cc. of absolute ether was slowly added to a solution of 250 mgrs. of lithium aluminum hydride in absolute ether contained in a reaction vessel bearing an inlet funnel and a reflux condenser, both provided with calcium chloride tubes. The vessel was mounted on a steam bath. The heating and the inlet velocity were regulated in such a way that a gentle reflux was maintained. After the solution was added refluxing was maintained for 10 minutes. The vessel was then put in an ice bath and water was added dropwise and cautiously to destroy the excess hydride. When the hydrogen evolution ceased, more water was added and the whole poured into dilute sulphuric acid, and the mixture stirred thoroughly. The ether layer was then washed with water, sodium bicarbonate solution and water to neutrality, dried and evaporated; the residue was crystallized from methanol, whereby pure alpha estradiol of melting point 174°–176° C. is obtained in almost quantitative yield.

Example II

A solution of one gram of estrone propionate, melting point 134°–135° C., in 50 cc. of dry ether was slowly added to a solution of 250 mgrs. of lithium aluminum hydride in dry ether. After following the same procedure as described in Example I, pure alpha estradiol, melting point 174°–176° C. was obtained.

It will be obvious to those skilled in the art that various changes may be made without departing from the spirit of the invention and therefore the invention is not limited to what is described in the specification but only as indicated in the appended claims.

We claim:

1. A method for the production of alpha estradiol from the lower fatty acid esters of estrone comprising reacting the said esters with an excess of lithium aluminum hydride under anhydrous conditions and thereafter hydrolyzing the lithium aluminum derivative formed.

2. A method for the production of alpha estradiol from the lower fatty acid esters of estrone comprising reacting the said esters with an excess of lithium aluminum hydride in the presence of a dry inert ether solvent and thereafter hydrolyzing the lithium aluminum derivative formed.

3. The method of claim 2 wherein the dry inert ether solvent is diethyl ether.

STEPHEN KAUFMANN.
GEORGE ROSENKRANZ.

REFERENCES CITED

The following references are of record in the file of this patent:

UNITED STATES PATENTS

| Number | Name | Date |
|---|---|---|
| 2,208,915 | Weisz | July 23, 1940 |
| 2,330,215 | Hildebrandt | Sept. 28, 1943 |

OTHER REFERENCES

Nystrom, Jour. Am. Chem. Soc., 69, 1197–1199 (1947).